(12) United States Patent
Janssen et al.

(10) Patent No.: US 11,411,769 B2
(45) Date of Patent: Aug. 9, 2022

(54) METHOD FOR ROUTING TELEGRAMS IN AN AUTOMATION NETWORK, AUTOMATION NETWORK AND NETWORK DISTRIBUTOR

(71) Applicant: Beckhoff Automation GmbH, Verl (DE)

(72) Inventors: Dirk Janssen, Verl (DE); Florian Essler, Augsburg (DE); Guido Beckmann, Verl (DE); Hans Beckhoff, Verl (DE); Holger Büttner, Berlin (DE); Martin Rostan, Nuremberg (DE); Thomas Rettig, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/388,860

(22) Filed: Jul. 29, 2021

(65) Prior Publication Data

US 2021/0359877 A1 Nov. 18, 2021

Related U.S. Application Data

(63) Continuation of application No. PCT/EP2020/057438, filed on Mar. 18, 2020.

(30) Foreign Application Priority Data

May 28, 2019 (DE) .................... 10 2019 114 309.8

(51) Int. Cl.
*H04L 12/46* (2006.01)
*H04L 45/02* (2022.01)
*H04L 12/40* (2006.01)

(52) U.S. Cl.
CPC ............ *H04L 12/462* (2013.01); *H04L 45/04* (2013.01); *H04L 2012/4026* (2013.01)

(58) Field of Classification Search
CPC ................... H04L 12/462; H04L 45/04; H04L 2012/4026; H04L 12/46; H04L 12/715
(Continued)

(56) References Cited

U.S. PATENT DOCUMENTS 6,700,877 B1 * 3/2004 Lorenz ................ H04L 61/2038
370/254
2002/0163920 A1 * 11/2002 Walker ................ H04L 63/0227
370/469
(Continued)

FOREIGN PATENT DOCUMENTS

CA 2655669 C 8/2014
CA 3139646 A1 2/2017
(Continued)

OTHER PUBLICATIONS

"EtherType," Wikipedia, from <https://en.wikipedia.org/w/index.php?title=EtherType&oldid=899106710>, 4 pages.
(Continued)

*Primary Examiner* — Sibte H Bukhari
(74) *Attorney, Agent, or Firm* — Dorsey & Whitney LLP

(57) ABSTRACT

A method for routing telegrams in an automation network with network subscribers interconnected via a data line network. At least network subscriber is a master subscriber, which sends telegrams to the network subscribers via the data line network. At least one network subscriber is a network distributor having a plurality of input/output ports, where input/output ports to which segments with further network subscribers are connected are designated as end ports. The master subscriber assigns a port address to each end port, and assigns the port address as an identifier to a
(Continued)

telegram intended for processing for a segment with further network subscribers. If the network distributor receives a telegram with a port address of an end port of the network distributor as an identifier, the network distributor outputs the telegram directly via the input/output port of the network distributor corresponding to the end port of the port address.

14 Claims, 3 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2005/0041653 A1* | 2/2005 | Arnold | H04L 45/24 370/383 |
| 2005/0117177 A1 | 6/2005 | Niitsuma | |
| 2010/0008372 A1 | 1/2010 | Weber | |
| 2010/0241773 A1* | 9/2010 | Rostan | H04L 12/403 710/110 |
| 2015/0103831 A1 | 4/2015 | Chandhoke et al. | |
| 2015/0117177 A1 | 4/2015 | Ganga et al. | |

FOREIGN PATENT DOCUMENTS

| | | |
|---|---|---|
| CN | 101374094 A | 2/2009 |
| CN | 101627580 A | 1/2010 |
| CN | 102106125 A | 6/2011 |
| CN | 102694721 A | 9/2012 |
| CN | 108463975 A | 8/2018 |
| DE | 112014005365 T5 | 8/2016 |
| DE | 102019114309 A1 | 12/2020 |
| WO | 2020239285 A1 | 12/2020 |

OTHER PUBLICATIONS

International Preliminary Report on Patentability dated Mar. 2, 2021 in connection with International Patent Application No. PCT/EP2020/057438, 49 pages including English translation.
International Search Report and Written Opinion dated Jun. 26, 2020 in connection with International Patent Application No. PCT/EP2020/057438, 22 pages including English translation.
Imtiaz, Jahanzaib et al. "A Layer-2 Multicast Forwarding Policy for a Generic Real-time Ethernet System," 2010 IEEE, 8 pages.
Jasperneite, Jürgen et al. "A Proposal for a Generic Real-Time Ethernet System," IEEE Transactions on Industrial Informatics, vol. 5, No. 2, May 2009, 11 pages.
Office Action dated May 19, 2022 in connection with Chinese patent application No. 202080029861.6, 12 pages including English translation.

* cited by examiner

METHOD FOR ROUTING TELEGRAMS IN AN AUTOMATION NETWORK, AUTOMATION NETWORK AND NETWORK DISTRIBUTOR

CROSS-REFERENCE TO RELATED APPLICATIONS

This application is a continuation of International Patent Application PCT/EP2020/057438, METHOD FOR ROUTING TELEGRAMS IN AN AUTOMATION NETWORK, DATA STRUCTURE, AUTOMATION NETWORK AND NETWORK DISTRIBUTOR, filed Mar. 18, 2020, claiming priority to German patent application DE 10 2019 114 309.8, VERFAHREN ZUM ROUTEN VON TELEGRAMMEN IN EINEM AUTOMATISIERUNGSNETZWERK, DATENSTRUKTUR, AUTOMATISIERUNGSNETZWERK UND NETZWERKVERTEILER, filed May 28, 2019, each of which is incorporated by reference herein, in the entirety and for all purposes.

FIELD

The present invention relates to a method for routing telegrams in an automation network. In addition, the invention relates to an automation network comprising network subscribers interconnected by a data-line network. Furthermore, the invention relates to a network distributor in the automation network which is embodied to execute the method for routing telegrams.

BACKGROUND

Automation networks are often operated as "field-bus systems". These are industrial bus systems that enable real-time capable control of the machines or plants of the automation network, wherein the machines or plants of the automation network are controlled by programmable logic controllers (PLCs). The PLC uses the field-bus system for the communication of the field devices, e.g. sensors and actuators of the machines or plants of the automation network with the PLC. If several network subscribers send telegrams via the same data line in the automation network, which may be embodied as a wired or wireless bus system, there must be a way for the network subscribers to share the same data line for data transmission. For this purpose, defined hierarchies and standardized data transmission protocols are provided.

In most cases, the field-bus systems operate in what is referred to as the "master-slave mode". This means that at least one network subscriber is embodied as a master subscriber and takes over the control of the processes, while the other network subscribers take over the processing of subtasks in the control mode of the automation network as slave subscribers. Data is exchanged in the automation network by telegrams that are outputted by the master subscriber to the slave subscribers. The slave subscribers read the output data addressed to them from the telegram and insert their input data into the telegram and send the telegram back to the master subscriber.

As a rule, network distributors referred to as "switches" are used in automation networks to interconnect the individual data lines with the connected network subscribers and to ensure that the data or telegrams reach their destination via the network subscribers connected to the individual input/output ports of the network distributors via the data line network.

In an automation network in which only telegrams with underlying Ethernet data transmission protocol are transmitted, the routing of the telegrams via the network distributors is done by routing tables. In this context, routing means the definition of transmission paths for the transmission of telegrams between the network distributors of the automation network. The routing tables mentioned have an entry for each combination of sending network subscriber and receiving network subscriber, which comprises the target MAC address (MAC: Media Access Control) of the receiving network subscriber, the sender MAC address of the sending network subscriber and the input/output port of the network distributor which is embodied as an output port via which the telegram is outputted.

If a connected network subscriber that processes the Ethernet data transmission protocol is replaced, the replaced network subscriber usually has a new sender MAC address. Since this new sender MAC address is not yet stored as an entry in the routing table of the network distributor, the network distributor must first update the routing table by a learning process, i.e. when a telegram is received from the network subscriber, the sender MAC address must be stored in the routing table so that the exchanged network subscriber may participate in the data communication. With the size of the automation network, the memory demand for the routing table increases in a disadvantageous manner.

Moreover, the network distributors may also be embodied as so-called "manageable switches", i.e. in addition to the basic functions they may also have control and monitoring functions. Telegrams with an underlying Ethernet data transmission protocol (e.g., the PROFINET IRT data transmission protocol) may e.g. be routed in the automation network via VLAN IDs (frame IDs), since the manageable switches usually support VLANs (VLAN: Virtual Local Area Network). VLANs are logical subnets within a network distributor or within the entire physical automation network. Each VLAN or subnet may in this context be assigned an identification number, i.e. a VLAN ID.

In the case of routing with VLAN IDs, as well, the routing table includes an entry with the VLAN ID, the input/output port of the network distributor that is configured as an input port, and the input/output port of the network distributor that is configured as an output port for each combination of sending network subscriber and receiving network subscriber. Such a routing table is configured using LLDP and SNMP protocols (LLDP: Link Layer Discovery Protocol, SNMP: Simple Network Management Protocol). The network distributor communicates with each network subscriber connected to the individual input/output ports via the LLDP protocol to determine who is connected. This information is stored in a database that may be accessed by a master subscriber using the SNMP protocol. This assumes that each network subscriber supports LLDP as well as SNMP protocol and has a database.

If a connected network subscriber that processes the Ethernet data transmission protocol is replaced, the subnets with which the replaced network subscriber is to communicate via VLAN IDs must be re-set again for the replaced network subscriber that also processes the Ethernet data transmission protocol.

In this case, the memory requirement for the routing table also grows in a detrimental manner as the size of the automation network increases.

In an automation network in which telegrams are transmitted with an underlying EtherCAT data transmission protocol, hereinafter referred to as EtherCAT network, no routing in the sense explained above to a specific network subscriber is required if the network subscriber is embodied as a slave subscriber and is able to process the EtherCAT data transmission protocol. This is because in an automation network embodied in this way the telegrams are always routed through all slave subscribers located in an EtherCAT segment and returned to the master subscriber by the last slave subscriber in the segment. In the EtherCAT network, the telegrams with underlying EtherCAT data transmission protocol may thus be routed from the network distributors to the EtherCAT segments. Usually, such an EtherCAT network is operated with only one data transmission rate. In addition, with increasing size of the EtherCAT network having a large number of slave subscribers, the runtime of the telegram through the EtherCAT network may increase, as well.

SUMMARY

The present invention specifies an improved method for routing telegrams in an automation network, an improved data structure, and an improved automation network.

EXAMPLES

According to a first aspect, a method for routing telegrams in an automation network is proposed. The automation network comprises network subscribers which are interconnected via a data line network. At least one network subscriber is embodied as a master subscriber and sends telegrams to the network subscribers via the data line network. Moreover, at least one network subscriber is embodied as a network distributor having a plurality of input/output ports, the input/output ports to which segments with network subscribers are respectively connected being embodied as end ports. The master subscriber respectively assigns a port address to each of the end ports. Furthermore, the master subscriber assigns the port address of the end port to which the segment with network subscribers is connected as an identifier to a telegram intended for processing for a segment with network subscribers. If the network distributor receives a telegram with a port address of an end port of the network distributor as an identifier, the network distributor outputs the telegram directly via the input/output port of the network distributor corresponding to the end port of the port address.

According to a second aspect, an automation network is proposed. The automation network comprises network subscribers which are interconnected via a data line network. At least one network subscriber is embodied as a master subscriber and sends telegrams to the network subscribers via the data line network. Moreover, at least one network subscriber is embodied as a network distributor having a plurality of input/output ports, the input/output ports to which segments with network subscribers are respectively connected being embodied as end ports. The master subscriber respectively assigns a port address to each of the end ports. Furthermore, the master subscriber assigns the port address of the end port to which the segment with network subscribers is connected as an identifier to a telegram intended for processing for a segment with network subscribers. If the network distributor receives a telegram with a port address of an end port of the network distributor as an identifier, the network distributor outputs the telegram directly via the input/output port of the network distributor corresponding to the end port of the port address.

According to a third aspect, a network distributor is proposed. The network distributor comprises a plurality of input/output ports, wherein the input/output ports to which segments with further network subscribers are respectively connected are designated as end ports. Each of the end ports is assigned a port address. As an identifier to a telegram intended for a segment with further network subscribers the port address of the end port, to which the segment with further network subscribers is connected, is assigned. The network distributor is adapted, when the network distributor receives a telegram with a port address of an end port of the network distributor as an identifier, to output the telegram directly via the input/output port of the network distributor corresponding to the end port of the port address.

In the proposed method, telegrams with port addresses as identifiers which are assigned to an end port of the network distributor may be outputted directly from the network distributor via the corresponding end port on the basis of the assignment of the port address to an end port without a complicated routing procedure with a complex routing table. Thus, the throughput of telegram transmission may be increased in an advantageous way compared to conventional routing methods.

In a further embodiment, the network distributor comprises input/output ports that are designated as routing ports. If the network distributor receives a telegram with an identifier that does not correspond to a port address of an end port of the network distributor, the network distributor routes the telegram via a forwarding port of the network distributor stored in a routing table. The entries in the routing table that are relevant for routing are advantageously limited to the port address, which may also be embodied as a destination address, and to the input/output port of the network distributor embodied as a forwarding port. Thus, memory may be saved due to the efficient use of information in the routing table. This may contribute to cost reduction in an advantageous manner.

Alternatively, the routing of the telegrams from the network distributor is also possible via VLAN IDs if the telegrams are sent from the master subscriber with a VLAN tag, or via MAC addresses, in which case a segment with network subscribers is assigned a VLAN ID or a MAC address in each case, by which the telegrams may be routed from the network distributor to the respective segment. Also, the proposed method does not require a learning process of the network distributor when a network subscriber in a segment is replaced. This is because a replaced network subscriber does not receive a new entry in the routing table of the network distributor, since the network subscriber may only be addressed via the assigned segment in which the replaced network subscriber is located. Since the port address is unchanged in this case, communication with the network subscriber may take place instantaneously.

According to a further embodiment, the forwarding port is also embodied as the end port. The master subscriber is embodied to send telegrams, which are disabled for processing by the network subscribers, via the data line network. If the network distributor receives a telegram with a port address as identifier from the master subscriber, which is intended for an end port of the network distributor and is disabled for processing by the network subscribers, the network distributor unlocks the telegram with the port address as identifier and outputs the telegram to the segment with network subscribers for processing via the corresponding input/output port assigned to the end port of the port address.

In an EtherCAT network, a segment with network subscribers that are embodied as EtherCAT slave subscribers may also be connected via the data line network to the input/output port of the network distributor that is embodied as a forwarding port. Thus, in this case the input/output port designated as forwarding port may also be the end port for the segment with EtherCAT slave subscribers. If in the following network subscribers in an automation network are referred to, this always includes EtherCAT slave subscribers in an EtherCAT network. Since the master subscriber may send telegrams that are disabled for processing by the network subscribers in order to increase confidentiality during telegram transmission in the automation network, it is necessary for the network distributor to release such a telegram for processing before it is outputted via the input/output port of the network distributor assigned to the port address, which is designated as the end port, so that the network subscribers in the corresponding segment may process the telegram. If, however, the network distributor outputs the telegram to another network distributor via the input/output port embodied as the forwarding port via the data line network, the network distributor usually does not unlock the telegram before outputting it, since other network subscribers may e.g. be connected via the data line network between the network distributor and another network distributor that could process the telegram. In the exemplary case, only the further network distributor would release the telegram for processing if the telegram is outputted directly from the further network distributor via an input/output port of the further network distributor embodied as an end port assigned to the port address, e.g. on the basis of the port address as the identifier of the telegram.

Conversely, the network distributor may also disable a telegram for processing by the network subscribers if the network distributor receives a telegram released for processing from a preceding network distributor in the automation network that is not intended for a segment with network subscribers connected directly via an input/output port of the network distributor embodied as an end port. In this way, as well, confidentiality may be increased during telegram transmission with the proposed method.

In a further embodiment, the port addresses of the end ports of the network distributor are formed as a continuous series. The network distributor may select a subset of the continuous series from a set of the continuous series for routing the telegrams with port addresses as identifiers on the basis of operators, the operators being embodied as comparison operators and/or as logical operators. If the port addresses of the end ports of the network distributor are embodied as a continuous series, the network distributor may advantageously perform simplified routing based on the port addresses using comparison and/or logical operators. For example, the network distributor may route telegrams with port addresses as identifiers having a numerical value $>=5$ and $<=8$ via the input/output ports of the network distributor embodied as forwarding ports. In this case, the continuous series may e.g. be in the form of symbols, numerical values, a combination of symbols and numerical values, etc.

According to a further embodiment, the master subscriber sends query telegrams over the data line network to detect the input/output ports of the network distributor.

The master subscriber, after receiving a query telegram from the network distributor with port information about the input/output ports of the network distributor, assigns the port address to the individual input/output ports of the network distributor to which segments with network subscribers are respectively connected and which are formed as end ports. The proposed method allows the automation network to be configured centrally by the master subscriber. In this way, the master subscriber may also set further network distributors in the automation network and assign unique port addresses for the input/output ports that are embodied as end ports in order to be able to address the segments with network subscribers specifically with telegrams.

By evaluating the port address as an identifier in the header section of the telegram, the network distributor may directly output the telegram quickly via the end port of the network distributor assigned to the port address or to further network distributors via the forwarding port of the network distributor via the data line network. With the first data field with the data element having a first or second value, the master subscriber may indicate a disabling or an enabling of the processing of the telegram for the network subscribers. The network distributor, if the telegram is directly assigned to an end port of the network distributor based on the port address as an identifier, may release the telegram for processing for the connected segment with network subscribers by the network distributor overwriting the value indicating the disabling with the other value. Furthermore, the first data field with the data element for indicating the disabling/release of a telegram for processing may be used variably for different data transmission protocols and is e.g. not limited to the real-time capable EtherCAT data transmission protocol.

According to a further embodiment, the automation network is embodied as an EtherCAT network and the telegram is embodied as an EtherCAT telegram. The EtherCAT telegram comprises a TAG field in the header section having a second, third, fourth and fifth data field. The second data field of the TAG field comprises a TAG protocol identification for identifying the TAG field in the header section of the EtherCAT telegram. The third and fourth data fields of the TAG field comprise the port address of the EtherCAT telegram formed as an identifier, which has a target port address and a sender port address. The fifth data field includes fragmenting information if the telegram is fragmented. The data section includes another header section that comprises a length field, a reserve field, and the first data field. The first data field is embodied as a type field and the data element is embodied as an EtherCAT protocol type. If the EtherCAT telegram is disabled for processing by the network subscribers, the EtherCAT protocol type has the first value. If the EtherCAT telegram is unlocked for processing by the network subscribers, the EtherCAT protocol type comprises the second value.

The telegram may advantageously be embodied as an EtherCAT telegram and use the tried and tested real-time capable EtherCAT data transfer protocol, wherein the further header section of the telegram is then embodied as an EtherCAT telegram header section. Here the EtherCAT protocol type of the type field comprises the second value, which by default with the value one (in the representation of the hexadecimal system) indicates the release of the processing of the telegram, i.e. an addressing of the slave subscribers of a segment. The type field may be configured as a 4-bit field, wherein a representation of 16 different protocol types is possible ($2^4=16$) and thus a further value of the protocol type may simply be used for disabling the processing of the telegram. The further value of the protocol type, i.e. the first value of the EtherCAT protocol type, which is formed differently from the second value, may consequently be implemented for the display of the disabling of the telegram processing for the slave subscribers of a segment. Preferably, the EtherCAT protocol type of a telegram is arranged in the EtherCAT header section of the telegram so that the network subscribers may detect a release of the telegram for processing or a disabling of the telegram for processing at an early stage and may start processing or forwarding to the next network subscriber without delay. In this way, the throughput in telegram transmission may be increased.

The network distributor may comprise a processing unit, which may be implemented as a software or as a hardware, and has a routing unit as well as a protocol chip. In particular, it is contemplated that the processing unit comprises a plurality of hardware components or hardware modules. In an EtherCAT network, the protocol chip may preferably be embodied as an EtherCAT slave controller and designate the network distributor as a full-fledged slave subscriber, so that the network distributor may additionally be capable of processing telegrams from the master subscriber. In addition to designating the network distributor as a slave subscriber, the network distributor may additionally route the telegrams of the master subscriber via the forwarding ports of the network distributor by the routing unit, which e.g. accesses the routing table stored in the memory unit of the EtherCAT slave controller or outputs them directly via the end ports of the network distributor. The network distributor may easily be integrated into existing automation networks, since the network distributor is based on the tried and tested EtherCAT technology and is compatible with existing EtherCAT networks.

The advantageous embodiments and further developments of the invention explained above and/or indicated in the sub-claims may be used individually or in any combination with one another—except e.g. in cases of clear dependencies or incompatible alternatives.

BRIEF DESCRIPTION OF THE DRAWINGS

The above-described features, characteristics and advantages of the present invention as well as the manner in which they are achieved will become clearer and more easily understood in connection with the following description of embodiments, which will be explained in more detail in connection with the schematic drawings, in which.

DETAILED DESCRIPTION

Figure 1:
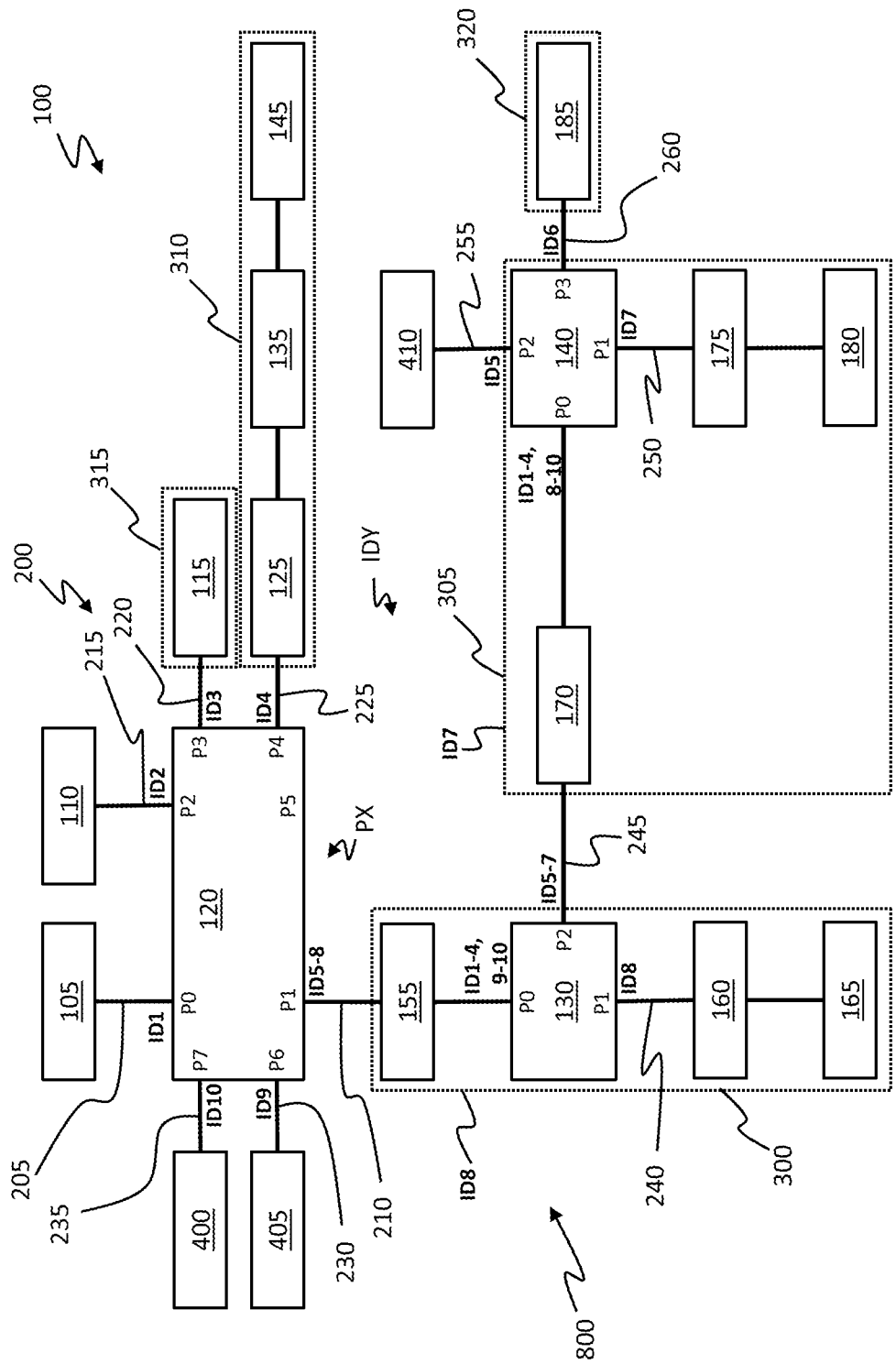
FIG. 1 shows a schematic structure of an automation network comprising network distributors, which is embodied to execute a method for routing telegrams.

It should be noted that the figures are merely schematic in nature and not to scale. In this context, components and elements shown in the figures may be exaggeratedly large or reduced in size for better understanding. Furthermore, it is pointed out that the reference signs in the figures remain unchanged if the elements and/or components have the same embodiment.

Automation networks are usually implemented as fieldbus systems in which the network subscribers are networked with one another via the field bus. The network subscribers may be embodied as at least one master subscriber, as at least one network distributor and as several network subscribers or slave subscribers, respectively. The aforementioned network subscribers may be embodied to exchange data with control units, wherein real-time capable data transfer protocols such as the EtherCAT data transfer protocol are generally used for this purpose. In addition, the automation network may also have network subscribers that may process other data transfer protocols such as TCP/IP (TCP/IP: Transmission Control Protocol/Internet Protocol), Ethernet, etc. These network subscribers do not have to be addressed for control tasks. For example, these data transmission protocol data may include diagnostic information about the automation network. The explanation below is based on the real-time capable EtherCAT data transmission protocol as an example.

The above-mentioned network subscribers connected via the data line network in the automation network may be interconnected via network distributors, so-called "switches" or "branches". The network distributors furthermore serve to coordinate the data exchange of the subscribers in the segments and to route the telegrams to their destination in good time. Known methods for routing the telegrams through the network distributors use MAC addresses of the individual network subscribers or VLAN IDs of the network subscribers. However, the disadvantage of these methods is that instantaneous communication with a replaced network subscriber is not possible because a network distributor may usually only store the new MAC address or the new VLAN ID of the replaced network subscriber in the routing table by a learning process. In addition, the routing table requires the associated MAC addresses or VLAN IDs and the input/output ports of the network distributor for each combination of transmitting and receiving network subscriber, which are embodied as input ports and output ports.

The core idea of the proposed method (proposed automation network and proposed network distributor respectively) therefore is the provision of a simplified method for routing telegrams in an automation network, in which the input/output ports of the network distributor are subdivided into designated end ports and forwarding ports, wherein segments with network subscribers are connected to the end ports via a data line network and further network distributors may be connected to the forwarding ports via the data line network in addition to network subscribers. Simplified routing may be achieved by assigning unique port addresses to the end ports of the network distributor, via which the network distributor may assign a telegram with an identifier as port address to an end port of the network distributor and the network distributor may output such a telegram directly via the corresponding end port to the segment having the network subscriber for which the telegram is intended. If the port addresses of the end ports of the network distributor and further network distributors form a continuous series, the routing of the telegrams via the forwarding port or ports of the network distributor may advantageously be restricted to a subset of the set of port addresses present in the automation network by comparison operators and/or logical operators. There is no limitation to the use of the EtherCAT data transmission protocol, even though this is the preferred data transmission protocol for the proposed method, automation network and network distributor, but may be used in all automation networks in which telegrams are to be routed.

The structure and operation of the automation network and the network distributor are described below on the basis of FIGS. 1 to 3, with the associated reference signs from the three figures being used in the description where useful and necessary.

FIG. 1 shows a schematic structure of an automation network 100 having network subscribers 800, which is embodied for a method for routing telegrams. The automation network 100 comprises network subscribers 800 which are interconnected via a data line network 200. At least one network subscriber 800 of the automation network 100 is embodied as a master subscriber 105, at least one network subscriber 800 is embodied as a network distributor, as shown in FIG. 1 for example as a first to third network distributor 120, 130, 140, and in addition there are further network subscribers 800 which are embodied for example as a further master subscriber 110 and as first to fourteenth network subscribers 110, 115, 125, 135, 145, 155, 160, 165, 170, 175, 180, 185, 400, 405, 410. The master subscriber 105 is connected to a first input/output port P0 of a first network distributor 120 via a first data line 205. The first input/output port P0 of the first network distributor 120 may e.g. be designated as an end port of the first network distributor 120, wherein a segment including network subscribers may be connected to an end port. However, in FIG. 1, only the master subscriber 105 is connected to the first input/output port P0. A first port address ID1, i.e. a combination of symbols and a numerical value, may e.g. be assigned to the first input/output port P0 as a designated end port, via which port address the first network distributor 120 may output a telegram from the network subscribers to the master subscriber 105 which is connected to the first input/output port P0 via the first data line 205.

The first network distributor 120 may be connected to a further master subscriber 110 via a third input/output port P2 over a third data line 215. The third input/output port P2 of the first network distributor 120 may also be designated as an end port of the first network distributor 120 and may be addressed directly by the first network distributor 120 with a telegram having a second port address ID2 as an identifier. The first network distributor 120 outputs the telegram having the second port address ID2 as an identifier to the further master subscriber 110 via the third input/output port P2 of the first network distributor 120, which is designated as an end port, via the third data line 215. For example, only the master subscriber 105 that is connected to the first input/output port P0 of the first network distributor 120 via the first data line 205 may be embodied to perform a central configuration of the automation network 100 with its network distributors and network subscribers.

A fourth input/output port P3 of the first network distributor 120 and a fourth data line 220 may connect the first network distributor 120 to a fourth segment 315 of the automation network 100. For example, the fourth segment 315 may include a first network subscriber 115. For clarity, only the input/output ports of the network distributors are shown in FIG. 1. Nevertheless, the other subscribers in the automation network 100 have input/output ports through which the subscribers are interconnected via the data line network 200. This aspect will not be discussed further in the following. In this context, the first network subscriber 115 may e.g. be a EK1100 coupler element manufactured by Beckhoff Automation GmbH & Co. KG and may be embodied to enable data communication at a first data transmission rate of 100 Mbit/s or a first symbol rate of 100 Mbaud and to process telegrams of the master subscriber 105. Accordingly, the first network subscriber 115 may be embodied as a slave subscriber and process a telegram "on the fly", i.e. read addressed output data and put input data into a telegram and forward the telegram to a subsequent network subscriber or otherwise send it back to the master subscriber 105.

When reference is made to "processing" in the following, the steps described that a network subscriber performs when processing a telegram on the fly are always included and are not explained further.

The fourth segment 315 may, by way of example, be embodied as described. Furthermore, it is contemplated that the fourth segment 315 deviates from the described embodiment and comprises further network subscribers or slave subscribers. The fourth input/output port P3 of the first network distributor 120, as well, is designated as an end port and is assigned a third port address ID3. Accordingly, the first network distributor 120 may output a telegram with the third port address ID3 as an identifier directly via the fourth input/output port P3 of the first network distributor 120 to the fourth segment 315 comprising the first network subscriber 115 for processing.

The first network distributor 120 may be connected to a third segment 310 of the automation network 100 via a fifth input/output port P4 of the first network distributor 120 and a fifth data line 225. The fifth input/output port P4 may be designated as an end port and may have been assigned a fourth port address ID4 by the master subscriber 105. The first network distributor 120 may output a telegram from the master subscriber 105 having the fourth port address ID4 as an identifier directly through the fifth input/output port P4 of the first network distributor 120 to the third segment 310 having network subscribers for processing. The third segment 310 may include a second network subscriber 125, a third network subscriber 135, and a fourth network subscriber 145, wherein the second to fourth network subscribers 125, 135, 145 may each be embodied as slave subscribers for processing telegrams from the master subscriber 105. The second network subscriber 125 may e.g. be configured as a coupler element. The third network subscriber 135 may be e.g. embodied as a simple branch, wherein the simple branch may be embodied to have routing functionality in addition to the protocol used in the method for data transmission and to support further protocols, such as the TCP/IP protocol (Transmission Control Protocol/Internet Protocol).

The fourth network subscriber 145 may e.g. also be configured as a simple branch. The second to fourth network subscribers 125, 135, 145 in the third segment 310 may likewise be embodied to implement data communication at a second data transmission rate of 1 Gbit/s or at a second symbol rate of 1 GBaud, respectively. Thus, for example, unlike the fourth segment 315, the third segment 310 may operate at the second data transmission rate of 1 Gbit/s instead of the first data transmission rate of 100 Mbit/s. The first and second data transfer rates mentioned above, as well as data transfer rates mentioned below, may also be implemented with values deviating from the above-described ones, such as the second data transfer rate with 2.5 Gbit/s or 5 Gbit/s or 10 Gbit/s, and so on.

For example, a sixth input/output port P5 of the first network distributor 120 may not have a data line connected to one or more network subscribers. Accordingly, no port address is assigned to the sixth input/output port P5 because the sixth input/output port P5 is not designated as an end port of the first network distributor 120. Here, the sixth input/output port P5 has been selected by way of example. It is further contemplated that another input/output port of the first network distributor 120 is configured in such a way or that network subscribers are connected to the sixth input/output port P5 of the first network distributor 120 and the sixth input/output port P5 is designated as an end port with an associated port address.

A seventh input/output port P6 and a sixth data line 230 connect the first network distributor 120 to a thirteenth network subscriber 405. The seventh input/output port P6 of the first network distributor 120 may likewise be designated as an end port and addressed with a ninth port address ID9. The first network distributor 120 may output a telegram via the seventh input/output port designated as an end port, analogous to the above description, using the ninth port address ID9 as an identifier of the telegram. For example, the thirteenth network subscriber 405 may not be embodied as a network subscriber processing the EtherCAT data transfer protocol, but as an Ethernet subscriber, wherein it may be characteristic of the Ethernet subscriber to process only telegrams with underlying Ethernet data transfer protocol. In this context, it is contemplated that the thirteenth network subscriber 405 does not form an independent segment in the automation network. For example, the thirteenth network subscriber 405 is embodied to implement data communication at the second data transmission rate of 1 Gbit/s.

An eighth input/output port P7 and a seventh data line 235 may connect the first network distributor 120 to a twelfth network subscriber 400. The eighth input/output port P7 of the first network distributor 120 may be embodied as an end port and addressed with a tenth port address ID10. The above description applies analogously to the output of a telegram using the tenth port address ID10 as an identifier. The twelfth network subscriber 400 may also be configured to process the Ethernet data transmission protocol and may represent an Ethernet subscriber. For example, the Ethernet subscriber may be configured to implement the data communication at the first data transmission rate of 100 Mbit/s. Similarly to the thirteenth network subscriber 405, the twelfth network subscriber 400 may not form an independent segment in the automation network 100.

A second input/output port P1 and a second data line 210 may connect the first network distributor 120 to a fifth network subscriber 155. The fifth network subscriber 155 may be configured for data communication at the second data rate. The fifth network subscriber 155 may be connected to a first input/output port P0 of a second network distributor 130 via the second data line 210, and may be configured as a slave subscriber for processing telegrams from the master subscriber 105.

The second network distributor 130 may be connected to a sixth network subscriber 160 via a second input/output port P1 of the second network distributor 130 and via an eighth data line 240. For example, the sixth network subscriber 160 may also be formed as an above-described simple branch and may process telegrams from the master subscriber 105. Further, the sixth network subscriber 160 may subsequently include a seventh network subscriber 165 on the eighth data line 240. The seventh network subscriber 165 may form the last network subscriber in a first segment 300 extending from the fifth network subscriber 155 to the seventh network subscriber 165, as the network subscribers in the individual segments are generally arranged in a chain. Further, the seventh network subscriber 165 may be embodied as a coupler element and may be suitable for processing telegrams from the master subscriber 105.

For example, the second network distributor 130 may be part of the first segment 300, provided that the second input/output port P1 of the second network distributor 130 is set for that purpose. Accordingly, the second input/output port P1 of the first network distributor 120 may be designated as an end port, wherein the end port may be assigned the first segment 300 with the fifth network subscriber 155, the second network distributor 130, the sixth network subscriber 160, and the seventh network subscriber 165. The first network distributor 120 may output a telegram with an eighth port address ID8 as an identifier, e.g. directly via the second input/output port P1 of the first network distributor 120 designated as an end port to the fifth network subscriber 155 forming the first network subscriber of the first segment 300 for processing.

The first segment 300 starting with the fifth network subscriber 155 and comprising the second network distributor 130, the sixth network subscriber 160, and the seventh network subscriber 165 may be embodied for data communication at the second data transmission rate of 1 Gbit/s, e.g. because the fifth network subscriber 155, the sixth network subscriber 160, and the seventh network subscriber 165 are embodied in such a way. However, it is also contemplated that the fifth network subscriber 155, the sixth network subscriber 160 and the seventh network subscriber 165 are equally capable of implementing both the second data transmission rate at 1 Gbit/s and the first data transmission rate at 100 Mbit/s, as are the first network distributor 120 and the second network distributor 130. In this regard, the first segment 300 may include additional network subscribers that are embodied to implement the first data transmission rate. In the case described, the data transmission rate for the subscribers of the first segment 300 may be set uniformly to the first data transmission rate. This likewise applies to the other segments, which may also have further network subscribers that are embodied to implement only the first data transmission rate. However, this property is not referred to again for the description of the other segments.

The second network distributor 130 is connected to an eighth network subscriber 170 via a third input/output port P2 and a ninth data line 245. The eighth network subscriber 170 e.g. forms the first network subscriber in a second segment 305 and may be provided for processing telegrams from the master subscriber 105 as a slave subscriber. The eighth network subscriber 170 may e.g. be embodied for data communication at the second data transmission rate. Accordingly, the third input/output port P2 of the second network distributor 130 may be designated as an end port for the second segment 305 and may be addressed with a seventh port address ID7. The eighth network subscriber 170 is further connected to a first input/output port P0 of a third network distributor 140 via the eighth data line 240. The third network distributor 140 may be part of the second segment 305, provided that a second input/output port P1 of the third network distributor 130 is set accordingly.

The third network distributor 140 may be connected to a fourteenth network subscriber 410 via a third input/output port P2 and an eleventh data line 255. Here, the third input/output port P2 of the third network distributor 140 may be a designated end port of the third network distributor 140 and may have been assigned a fifth port address ID5 by the master subscriber 105. For example, the fourteenth network subscriber 410 is formed as an Ethernet switch that processes the Ethernet data transmission protocol. In the automation network 100, it may be intended for the fourteenth network subscriber 410 in the same way as for the twelfth and thirteenth network subscribers 400, 405 to not embody an independent segment of the automation network 100, since, for example, only network subscribers that process the EtherCAT data transmission protocol are provided for this.

Nevertheless, the master subscriber 105 may have assigned the fifth port address ID5 to the third input/output port P2 of the third network distributor 140 within the framework of a method for detecting the network subscribers of the automation network 100 by query telegrams, i.e. within the framework of the central configuration of the automation network 100, after the third network distributor 140 has entered port information about the input/output ports of the third network distributor 140 to which segments with network subscribers are respectively connected into the query telegram to the master subscriber 105. With a further query telegram issued by the third network distributor 140 via the third input/output port P2 over the eleventh data line 255, the master subscriber 105 may have detected the fourteenth network subscriber 410 as an Ethernet switch in a next step. The example of capturing the fourteenth network subscriber 410 from the master subscriber 105 applies analogously to the twelfth and thirteenth network subscribers 400, 405 and the remaining network subscribers arranged in segments.

The third network distributor 140 may be connected to an eleventh network subscriber 185 of a fifth segment 320 of the automation network 100 via a fourth input/output port P3 and a twelfth data line 260. The fourth input/output port P3 of the third network distributor 140 may also be designated as an end port and may have been assigned a sixth port address ID6 by the master subscriber 105, for addressing the fifth segment 320 with the eleventh network subscriber 185. For example, the eleventh network subscriber 185 may be configured to implement the first data transmission rate and process telegrams from the master subscriber 105.

A second input/output port P1 of the third network distributor 140 and a tenth data line 250 may connect the third network distributor 140 to a ninth network subscriber 175. The ninth network subscriber 175 may be part of the second segment 305 and formed as a coupler element to process telegrams from the master subscriber 105 as a slave subscriber. The ninth network subscriber 175 may be configured to implement the second data transmission rate. Following the ninth network subscriber 175, a tenth network subscriber 180 may be connected to the tenth data line 250, which may also be embodied as a slave subscriber for processing telegrams from the master subscriber 105 and may be implemented as a simple branch. The tenth network subscriber 180 may e.g. represent the last network subscriber of the network subscribers arranged in a chain in the second segment 305. Consequently, the second input/output port P1 of the third network distributor 140 forms a designated end port for the second segment 305 which may be addressed with the seventh port address ID7. In summary, the master subscriber 105 may address the eighth network subscriber 170, the third network distributor 140, the ninth network subscriber 175, and the tenth network subscriber 180 with a telegram having the seventh port address ID7 as an identifier.

The first to third network distributors 120, 130, 140 each comprise input/output ports designated as forwarding ports or realized as so-called routing ports. For example, the second input/output port P1 of the first network distributor 120, in addition to being designated as an end port for the first segment 300, is also designated as a forwarding port. That is, due to the assignment of the eighth port address ID8 to the second input/output port P1, the first network distributor 120 may output a telegram with the eighth port address ID8 as an identifier directly to the first segment 300 via the second input/output port P1. Furthermore, the first network distributor 120 may route a telegram from the master subscriber 105 having, for example, the seventh port address ID7 as an identifier, via the second input/output port P1 of the first network distributor 120 designated as a forwarding port. In particular, here the routing from the first network distributor 120 may be simplified for the telegram to a routing decision that may be made using comparison operators and/or logical operators. For example, for this purpose, the master subscriber 105 may have stored in the routing table of the first network distributor 120 that the first network distributor 120 routes telegrams with port addresses that are greater than or equal to the combined symbol and number value of the fifth port address ID5 and less than or equal to the combined symbol and number value of the eighth port address ID8 via the second input/output port of the first network distributor 120 that is designated as a forwarding port. Furthermore, the master subscriber 105 may disable the telegram with the seventh port address ID7 as an identifier for processing by the network subscribers and indicate this e.g. with a first value of a data element of a first data field in the telegram or a first value of an EtherCAT protocol type in the telegram to prevent the first network distributor 120 and the fifth network subscriber 155 from processing the telegram on its way to the second network distributor 130. Furthermore, it is contemplated that the assignment of the port addresses to the input/output ports of the network distributors designated as end ports is also stored in the routing tables of the network distributors by the master subscriber 105.

The second network distributor 130 may also comprise an input/output port designated as a forwarding port, which may also be designated as an end port. In FIG. 1, this is e.g. the third input/output port P2 of the second network distributor 130. The third input/output port P2 of the second network distributor 130 is the end port for the telegram with the seventh port address ID7 as identifier, and is also the input/output port via which the second network distributor 130 routes telegrams with the fifth and sixth port addresses ID5, ID6 as identifiers. In the routing table of the second network distributor 130, as well, it may be stored that the second network distributor routes or outputs telegrams with port addresses as combined symbol numerical values greater than or equal to the fifth port address ID5 and less than or equal to the seventh port address ID7 via the third input/output port P2. In addition, it may be stored in the routing table, e.g. for the telegram with the seventh port address ID7 as an identifier, that the second network distributor 130 outputs the first value of the data element or of the EtherCAT protocol type of the telegram to the second value or overwrites it with the second value, which indicates to the network subscribers of the second segment 305 that processing of the telegram has been enabled, before the second network distributor 130 outputs the telegram via the third input/output port P2, which in this case corresponds to a designated end port, and via the ninth data line 245 to the second segment 305 for the network subscribers for processing.

Once the last network subscriber has processed the telegram, the third network distributor 140 may send the telegram back to the master subscriber 105 via the first input/output port, which is a designated forwarding port in this case, the master subscriber 105 being addressable via the first port address ID1. This is because it may be stored in the routing table of the third network distributor 140 that the third network distributor 140 outputs or routes telegrams with port addresses as identifiers as a combined symbol numerical value greater than or equal to the first port address ID1 and less than or equal to the fourth port address ID4, and greater than or equal to the eighth port address ID8 and less than or equal to the tenth port address ID10 via the first input/output port P0 of the third network distributor 140. In the same way, the routing table of the second network distributor may also have an entry similar to the above explanation to enable the second network distributor 130 to output or route telegrams having port addresses as identifiers as a combined symbol numerical value greater than or equal to the first port address ID1 and less than or equal to the fourth port address ID4 and greater than or equal to the fifth port address ID5 and less than or equal to the seventh port address ID7 via the first input/output port P0, as a designated forwarding port.

Here, too, it may additionally be stored in the second network distributor 130 that if the second network distributor 130 receives a telegram from the third network distributor 140 and the telegram is not intended for any input/output port of the second network distributor 130 designated as an end port, and the telegram is additionally enabled for processing by the network subscribers, which is indicated by the second value of the data element or of the EtherCAT protocol type in the telegram, to overwrite the second value of the data element or EtherCAT protocol type with the first value of the data element or EtherCAT protocol type, respectively, so that the telegram is disabled for processing by the network subscribers on its way back to the master subscriber 105. The first network distributor 120 directly outputs the explained telegram of the example case with the first port address ID1 as identifier via the first input/output port P0 to the master subscriber 105.

FIG. 1 exemplarily shows three network distributors, the first to third network distributors 120, 130, 140, each with a different number of first to eighth input/output ports P0 to P7. Depending on the structure of the automation network 100, there may also be more or fewer network distributors than the first to third network distributors 120, 130, 140 shown here in FIG. 1. As described, the individual network distributors may each have a different number of input/output ports, so that these may generally also be referred to as input/output ports PX, wherein the X is an index for the numerical value of the respective input/output port. Also, the maximum number of input/output ports PX in a single network distributor is not limited to the number of eight input/output ports PX shown by way of example in FIG. 1.

The first to tenth port addresses ID1 to ID10 may generally also be referred to as port addresses IDY, wherein the Y as an index stands for the numerical value of the described combined symbol numerical value of the individual port addresses. Depending on the structure of the automation network 100, there may be more or less than the port addresses IDY shown here in FIG. 1. In FIG. 1, the port addresses IDY of the input/output ports PX of the individual network distributors, which are designated as end ports, form a continuous series so that the master subscriber 105 may assign for each network distributor, e.g. in a clockwise direction. The advantage of forming the port addresses IDY as a continuous series or clockwise assignment is that routing decisions of the network distributors may then be simplified and, in particular, made on the basis of comparison operators and/or logical operators. The entries in the routing table are also reduced by the simplified routing via port addresses IDY. However, the assignment of port addresses IDY is not limited to the shown and described embodiment example, but may be implemented in a different manner. In addition, it is possible to use MAC addresses or VLAN IDs instead of port addresses IDY for the input/output ports PX of the network distributors that are designated as end ports, and to perform routing via the input/output ports PX of the network distributors that are designated as forwarding ports by MAC addresses or VLAN IDs. Again, routing decisions based on comparison operators and/or logical operators may be performed by the network distributors, provided that the MAC addresses or VLAN IDs are also assigned as a continuous series by the master subscriber 105.

The automation network 100 shown in FIG. 1 may be embodied as an EtherCAT network and data transmission between the master subscriber 105 and the individual further network subscribers 800 may be performed by the real-time capable EtherCAT data transmission protocol. In this context, the first to fifth segments 300 to 320 shown in FIG. 1 represent EtherCAT segments.

An EtherCAT network usually comprises a data line network 200 comprising data lines each having a forward line and a return line. A network subscriber 800 in an EtherCAT network is embodied to process an enabled telegram on the forward line, i.e. to read the output data of the unlocked telegram addressed to the network subscriber 800 and to put the input data of the network subscriber 800 into the unlocked telegram. The telegrams are sent back in the EtherCAT network via the return line, wherein the network subscribers 800 do not process the unlocked telegram via the return line.

The first network distributor 120 as well as the second and third network distributors 130, 140 are not limited to the network topology shown in FIG. 1, but may also be used in networks with different network topologies. Furthermore, they are not limited to an EtherCAT network, but may also be used in other networks in which network distributors are required for routing the telegrams and the network distributors are also to be used for processing the telegrams.

Figure 2:
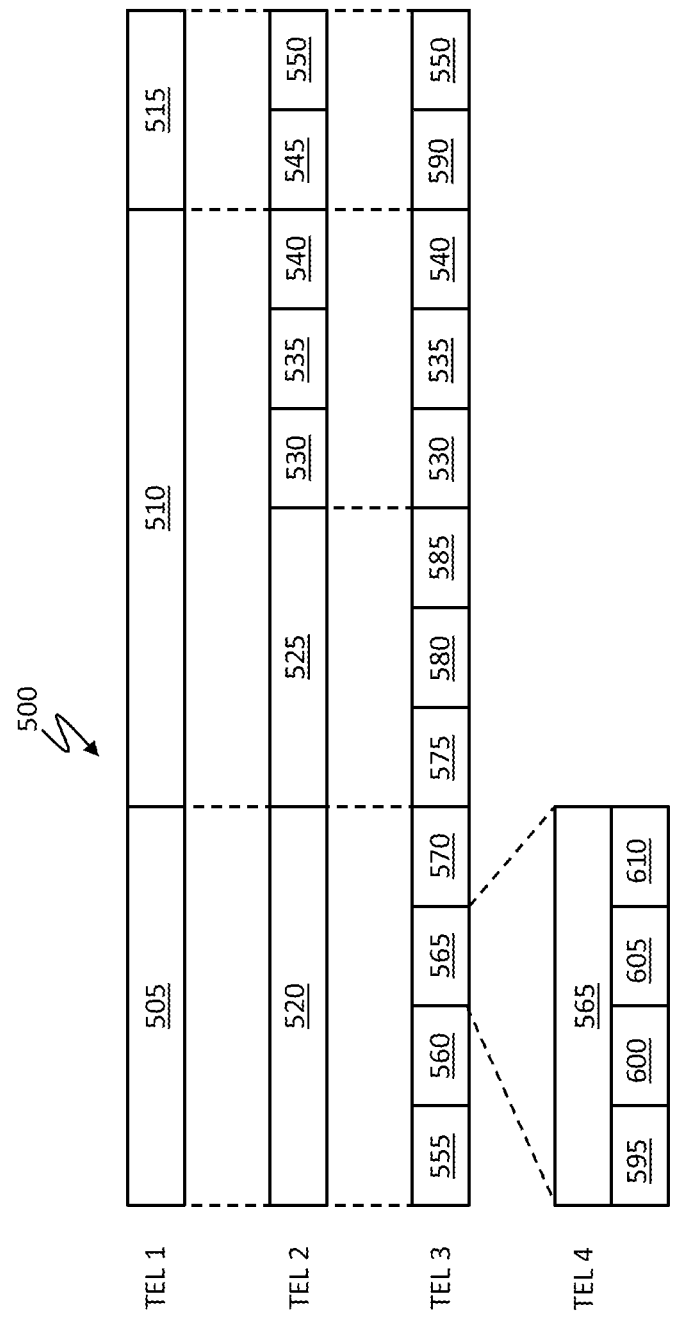
FIG. 2 a schematic diagram of a data structure for use in the method.

FIG. 2 shows a schematic structure of a data structure 500 for use in the method for transmitting data in the automation network 100 shown in FIG. 1. The data structure 500 is embodied as a telegram which is e.g. output by the master subscriber 105 in FIG. 1 to the network subscribers in the automation network 100 for processing for control operation. The data structure 500 in FIG. 2 has a first telegram structure TEL1 and comprises a header section 505, a data section 510, and an end section 515. For example, the data structure 500 may be formed according to IEEE standard 802.3 and comprise the Ethernet data frame format for a packet-oriented transmission of the data. If, for the data structure 500, the EtherCAT data transmission protocol is embodied to process user data of the data structure 500 in addition to complying with the Ethernet data frame structure, the data structure comprises a second telegram structure TEL2. The header section 505 of the data structure 500 is then embodied as an Ethernet header section 520.

The data section 510 of the data structure 500 then comprises an EtherCAT header section 525 that comprises instructions for the network subscribers in the automation network 100. Furthermore, the data section 510 comprises EtherCAT data that may be implemented in the form of datagrams. For example, the data section 510 may include a first datagram 530, a second datagram 535, and an nth datagram 540, wherein the nth datagram 540 indicates that the data structure 500 may include any number of datagrams in total. Here, however, no restriction is intended to be placed on any particular number of datagrams in the data structure 500. The datagrams themselves each have a control data field and a payload data field. The control data field comprises a command field which informs the network subscriber embodied as an EtherCAT slave subscriber, in which way the network subscriber is to process the user data of the data structure 500 embodied as an EtherCAT telegram, i.e. for example, whether the network subscriber is to insert data into the user data field of the EtherCAT telegram in a write operation, or whether the network subscriber is first to extract data from the user data field and then insert them into the user data field in a read/write operation, or whether the network subscriber is only to extract data from the user data field in a read operation, respectively. If a network subscriber is referred to in the following, this also includes an EtherCAT slave subscriber. Furthermore, the control data field has an address field. The data area in the network subscriber by which the network subscriber is to exchange data when passing through the user data field is defined in the address field.

After receiving the control data field in the datagram of the EtherCAT telegram, the network subscriber starts to evaluate the command field and the address field. If the network subscriber is addressed via the data element for processing the EtherCAT telegram, the network subscriber takes the output data intended for it from the user data field in the case of a read datagram or a read/write datagram while the datagram passes through the network subscriber in the EtherCAT telegram. If it is a write or a read/write datagram, the corresponding network subscriber inserts the input data in the user data field in the datagram as it passes through.

The end section 515 of the data structure 500 embodied as an EtherCAT telegram, hereinafter referred to as EtherCAT telegram, moreover comprises a padding field 545 and a checksum field 550 in the second telegram structure TEL2. The padding field 545 is required to bring the EtherCAT telegram in the Ethernet data frame to the necessary minimum size of the Ethernet data frame of 64 bytes by inserting additional bytes added as pad into the EtherCAT telegram. The padding field may be necessary if e.g. less than 46 or 42 bytes (without or with a VLAN TAG conforming to the IEEE 802.1Q standard) are to be transmitted with the EtherCAT telegram as user data, wherein a preamble and a start frame delimiter field, which are not included in FIG. 2, are not counted. The checksum field may ensure an integrity check of transmitted data. For example, the checksum field may include a calculated CRC (Cyclic Redundancy Check) checksum that is calculated over the Ethernet data frame, starting with a target MAC address and ending with the padding field, so that the checksum itself is not included in the CRC checksum. The CRC checksum is generated by the sender and appended to the padding field. The receiver performs the same CRC checksum calculation after receiving the EtherCAT telegram, and if the CRC checksum calculated by the receiver does not match the CRC checksum transmitted with the EtherCAT telegram, the receiver assumes that data transmission was faulty. In such a case the EtherCAT telegram may be discarded by the receiver.

A third telegram structure TEL3 in FIG. 2 shows a more detailed structure of the Ethernet header section 520. The Ethernet header section 520 has a target address field 555, which comprises the above-mentioned target MAC address, which identifies the network subscriber, which may be an EtherCAT slave subscriber, a network distributor or a master subscriber in the automation network 100 according to FIG. 1, that is to receive the EtherCAT telegram. The target MAC address may also be a multicast address (addressing of a plurality of network subscribers in the automation network 100) or a broadcast address (addressing of all network subscribers in the automation network 100). Following the target address field 555, the Ethernet header section 520 has a sender address field 560. The sender address field 560 comprises a sender address, which is also formed as a MAC address and identifies the sender. The target address field 555 and the sender address field 560 each comprise 6 bytes.

Furthermore, the Ethernet header section 520 has a TAG field 565 following the sender address field 560. This may e.g. be embodied as a VLAN TAG TAG field in accordance with the IEEE 802.1Q standard (VLAN: Virtual Local Area Network) and comprise 4 bytes. Following the TAG field 565, the Ethernet header section 520 has a protocol field 570. The protocol field 570 may be formed as a so-called "Ethertype" field and may comprise a value indicating a used protocol of a next higher layer within user data, wherein a layer and a next higher layer are defined according to the OSI model (OSI: Open Systems Interconnection), i.e. the reference model for data transmission protocols in a layered architecture. For example, the protocol field 570 has the value 0x88A4 (in hexadecimal system) if the telegram is formed as an EtherCAT telegram, since this value is associated with the real-time capable EtherCAT data transfer protocol.

The EtherCAT head section 525 comprises a length field 575. The length field 575 provides information about the length of the EtherCAT datagrams. Following the length field 575 the EtherCAT head section 525 comprises a reserve field 580 for a case of need. Following the reserve field 580, the EtherCAT head section 525 comprises a first data field 585 formed as a type field. The first data field 585 comprises the data element with the first or the second value, wherein the data element is formed as an EtherCAT protocol type. The EtherCAT protocol type comprises the second value if the segment addressed with the telegram identifier is addressed with network subscribers for processing. The EtherCAT protocol type then has the value 0x1 (in hexadecimal system) and the network subscribers in the segment recognize from this value that the EtherCAT telegram is enabled for processing and start processing the datagrams in the EtherCAT telegram.

The EtherCAT protocol type has the first value, which is formed differently from the second value with 0x1 (in hexadecimal system), e.g. the first value may correspond to the value 0x6 (in hexadecimal system), if the EtherCAT telegram is disabled for processing by the network subscribers in the respective segment. The port address as identifier of the telegram may e.g. be formed as MAC address of the target address field 555. Furthermore, the port address as identifier of the telegram may also be formed as a VLAN ID when using the TAG field 565, which may be formed as a VLAN TAG TAG field. In this case, the VLAN TAG TAG field may comprise 4 bytes, i.e. 32 bits, wherein the first two bytes comprise the value 0x8100 to identify the Ethernet data frame as a tagged Ethernet data frame according to the IEEE 802.1Q standard. The remaining two bytes comprise the VLAN ID, a fragmenting information in case of fragmentation of the EtherCAT telegram, and a priority with which the EtherCAT telegram may be sent, wherein the priority may be in the form of a priority value. The individual datagrams in the third telegram structure TEL3 will not be discussed herein again, since these may be embodied in the same way as the datagrams of the second telegram structure TEL2.

The end section 515 may include a fragmenting field 590 instead of the padding field 545 if the EtherCAT telegram is fragmented by a network distributor. The fragmenting field 590 may comprise the value zero or have a truth value of zero, indicating that no fragmentation of the EtherCAT telegram has occurred. Bits zero through three of the fragmenting field 590 may comprise a data frame count indicating a value used to identify the respective Ethernet data frame, where bits zero through three may be used to represent values from one through 15 when the EtherCAT telegram has been fragmented by a network distributor. Bits four to seven of the fragmenting field 590 may be provided as reserve bits.

The TAG field 565 may also be structured according to a fourth telegram structure TEL4, wherein in FIG. 2 a representation of the further fields of the Ethernet head section 520 is shown in the third telegram structure TEL3, as well as the EtherCAT head section 525 and the end section 515. Nevertheless, the fourth telegram structure TEL4 may be formed as a complete EtherCAT telegram. The TAG field 565 may be formed after the fourth telegram structure TEL4, e.g. as a so-called "ROUT TAG" and may be different from a VLAN TAG. The TAG field 565 comprising ROUT TAG may comprise a second data field 595 formed as a TAG protocol identifier for identifying the TAG field 565. For example, the second data field 595 may have a value that identifies the Ethernet data frame as a tagged Ethernet data frame according to the IEEE 802.1Q standard, but is formed differently from the VLAN TAG identification with the value 0x8100 (in hexadecimal). Here, the ROUT TAG in the second data field 595 may have a separate identification in the hexadecimal system. Furthermore, it is contemplated that the ROUT TAG is marked with the value 0x88A4 (in hexadecimal system), which is linked to the real-time capable EtherCAT data transmission protocol, and additionally with a further value, a so-called "Sub-Type". The Sub-Type may e.g. have the value 0x7 (in hexadecimal system).

Following the second data field 595, the TAG field 565 may include a third data field 600. Furthermore, the TAG field 565 may include a fourth data field 605 between the third data field 600 and a fifth data field 610. The third data field 600 and the fourth data field 605 may preferably comprise the port addresses as identifiers of the EtherCAT telegrams. In this context, the port address as an identifier for an EtherCAT telegram may e.g. comprise a target port address (e.g. the first port address ID1 as a target port address for a telegram to be sent back to the master subscriber 105), as well as a sender port address (e.g. the seventh port address ID7 as a sender port address for a telegram originating from the network subscribers of the second segment 305), wherein the third data field 600 may comprise the target port address and the fourth data field 605 may comprise the sender port address. The fifth data field 610 may include an unoccupied area, e.g. bits zero through bit eleven of the fifth data field 610 may serve as reserve bits. Further, the fifth data field 610 may comprise the fragmenting information, as described above in connection with the VLAN TAG, in case of fragmentation of the EtherCAT telegram, and the priority with which the EtherCAT telegram may be sent.

Furthermore, the EtherCAT telegram may also be embedded in a UDP/IP (UDP: User Datagram Protocol, IP: Internet Protocol) data frame structure. In this case, the Ethernet header 520 has the target address field 555 and the sender address field 560. Following the sender address field 560, the Ethernet header section 520 includes the protocol field 570, wherein the protocol field 570 has the value 0x0800 (in hexadecimal) indicating the Internet Protocol (IPv4, Internet Protocol Version 4). The protocol field 570 is followed by an IP header section and a UDP header section in the Ethernet header section 520. The EtherCAT header section 525, datagrams and end section 515 may be formed in the case analogous to the above description, wherein the end section 515 may include the padding field 545 as well as the checksum field 550. Furthermore, the EtherCAT telegram may have the TAG field 565 in addition to the embedding in the UDP/IP data frame structure, wherein the TAG field 565 may be embodied as a VLAN TAG. The TAG field 565 is then arranged analogously to the third telegram structure TEL3. It is also contemplated that the EtherCAT telegram has the ROUT TAG instead of the VLAN TAG.

Figure 3:
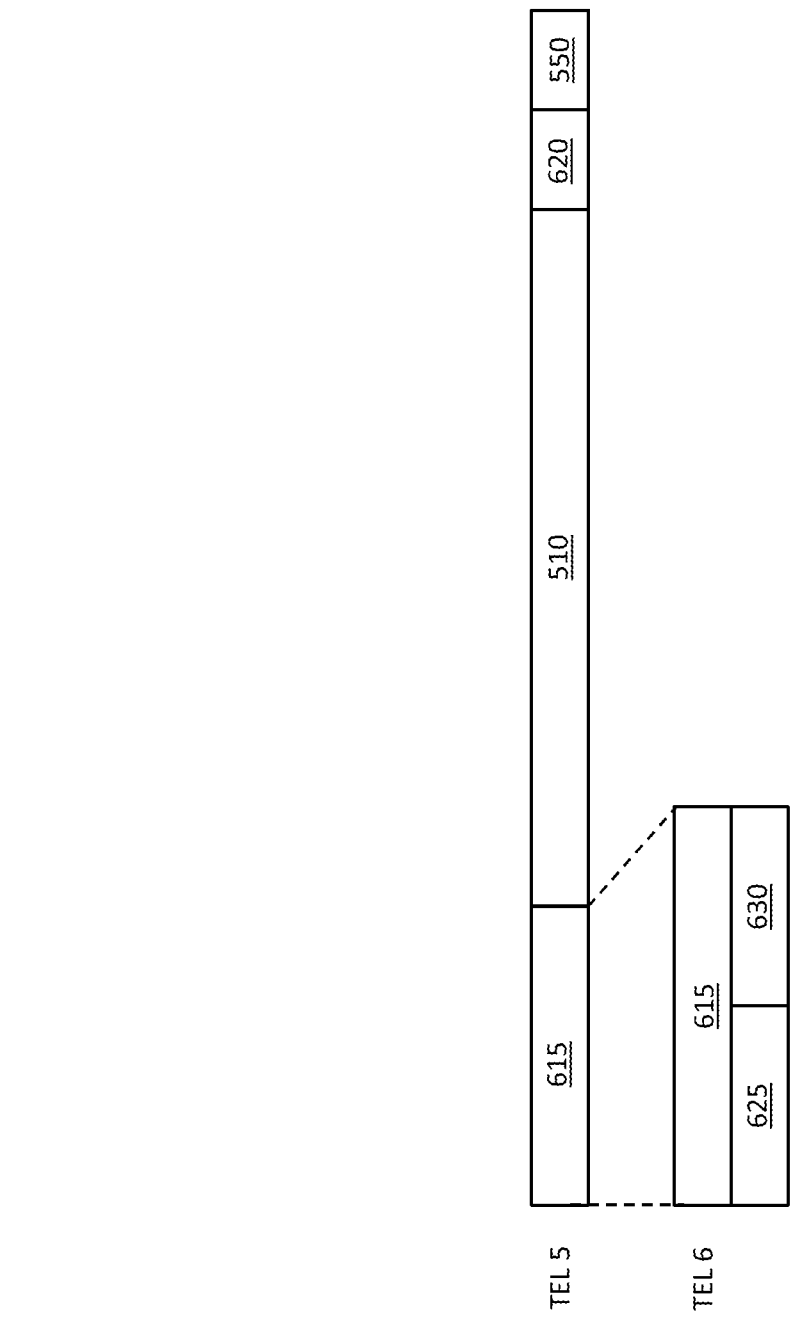
FIG. 3 shows a schematic structure of a further data structure for use in the method.

FIG. 3 shows a schematic fifth and sixth telegram structure TEL5, TEL6 for the data structure 500 in FIG. 2, which may be an EtherCAT telegram. In particular, the EtherCAT telegram may have the fifth telegram structure TEL5 and the sixth telegram structure TEL6 if the EtherCAT telegram has been fragmented by a network distributor in the automation network 100 shown in FIG. 1 and a first fragment of the fragmented EtherCAT telegram e.g. comprises the third and fourth telegram structure TEL3, TEL4. A second to nth fragment of the EtherCAT telegram may comprise the fifth and sixth telegram structure TEL5, TEL6. The EtherCAT telegram has a fragment target address field 615, wherein the fragment target address field 615 comprises a seventh data field 625 and an eighth data field 630 according to the sixth telegram structure TEL6. For example, the seventh data field 625 of the fragment target address field 615 may comprise 4 bytes and may be embodied as a multicast address space, wherein the multicast address space comprises multicast addresses that are used to address multiple segments comprising network subscribers in the automation network 100 shown in FIG. 1. Alternatively, the multicast address space may be in the form of a unicast address space, wherein the unicast address space has unicast addresses that are used to address a single segment with network subscribers in FIG. 1. Furthermore, the multicast address space may also be in the form of a broadcast address space, wherein the broadcast address space comprises broadcast addresses that are used to address all segments with network subscribers in FIG. 1.

As an alternative to the above description, it is also contemplated that the seventh data field 625 may comprise the target MAC address mentioned in connection with the target address field 555 of the Ethernet header section 520. In addition to the target MAC address, the seventh data field 625 may further comprise the sender address mentioned in connection with the sender address field 560 of the Ethernet header section 520, which may also be a MAC address.

The eighth data field 630 of the fragment target address field 615 may comprise 2 bytes. Bits zero through three of the eighth data field 630 may comprise the data frame count which may indicate the value of the respective Ethernet data frame. Bits four through seven as well as bit twelve may further be provided as reserve bits and have no allocation. Bits eight through eleven may comprise a fragment number which may indicate a value of the respective fragment in order to be able to assign the individual fragments to the associated Ethernet data frame. Further, bits thirteen to fifteen may have the priority with which the second to nth fragment of the EtherCAT telegram may be sent, wherein the priority may be embodied as a priority value. The data section 510 in the fifth telegram structure TEL5 has exemplarily been selected and may be formed according to the second and third telegram structure TEL2, TEL3 in FIG. 2. Following the data section 510, the second to nth fragment of the EtherCAT telegram may comprise a sixth data field 620 comprising one byte. The bits zero to three of the sixth data field 620 may be provided to indicate whether a further fragment follows or whether the fragment to be transmitted already forms the last fragment of the EtherCAT telegram.

For example, the value zero may be used to indicate that the fragment to be transmitted is the last fragment of the EtherCAT telegram. Furthermore, bits four to six may be used as reserve bits and bit seven may be used to indicate filling, i.e. padding, of the second to nth fragments of the EtherCAT telegram with filler bytes if the minimum length is not reached. Furthermore, the second byte of the sixth data field 620 may indicate the data frame number, which may indicate the value of the respective Ethernet data frame. Finally, the second to nth fragment of the EtherCAT telegram according to the fifth telegram structure TEL5 may comprise the checksum field 550 with the checksum calculated over the second to nth fragment, which may be formed analogously to the above description. Since the sixth data field 620 and the checksum field 550 together comprise 5 bytes, the fragment target address field 615 as well as the data section 510 of the second to nth fragment of the EtherCAT telegram may together comprise at least 59 bytes without padding being required for the second to nth fragment of the EtherCAT telegram to reach the minimum Ethernet frame length of 64 bytes.

In addition, the eighth data field 630 may also comprise its own TAG protocol identification, as described above in connection with the second data field 595 and the TAG field 565, if the eighth data field 630 is e.g. formed as a fragmenting TAG instead of a VLAN TAG. The TAG protocol identification of the eighth data field 630 may have its own value in the hexadecimal system. Furthermore, it is also contemplated that the TAG protocol identification comprises the value 0x88A4, which is associated with the real-time capable EtherCAT data transmission protocol, and additionally has a further value, the sub-type, which may e.g. comprise the value 0x8 in the hexadecimal system to identify the fragment target address field 615.

Furthermore, the structure of the EtherCAT telegram does not necessarily have to contain the sequence of the network subscribers in the segments, since on the one hand the EtherCAT telegrams may address physical memory addresses, hereinafter referred to as physical address section, of the network subscribers in the segments and on the other hand the EtherCAT telegrams may also be embodied as logical telegrams. In the second case, a logical address, i.e. a logical address section, and a length of the address section may be specified in the EtherCAT telegram. In particular, a logical address section may be embodied larger than a physical address section, so that the physical address section may be placed in the logical address section. Furthermore, the logical address section may be placed consecutively in the EtherCAT telegram.

The ability to process the ROUT TAG from the individual network subscribers in the automation network 100 shown in FIG. 1 is described below. If an input/output port of a network distributor designated as an end port is connected to a segment with network subscribers that are embodied to implement the first data transmission rate, e.g. the fourth segment 315 as well as the fifth segment 320 in FIG. 1, the network subscribers in said segments would not understand the ROUT TAG described in FIG. 2 and consequently would not be able to process a telegram from the master subscriber 105 with the ROUT TAG. Apart from the value for the EtherCAT data transmission protocol in the protocol field 570, the network subscribers in the above-mentioned segments understand the TAG protocol identification of the second data field 595, provided that the TAG field 565 is embodied as a VLAN TAG. Then the TAG protocol identification is formed as VLAN TAG TAG protocol identification and comprises the value 0x8100 (in hexadecimal system).

Accordingly, the first network distributor 120 or the third network distributor 140 would have to convert a telegram with ROUT TAG into a telegram with VLAN TAG before outputting it to the fourth segment 315 or the fifth segment 320. Here the target port address is not required within an EtherCAT segment, i.e. within the mentioned segments in FIG. 1, thus a conversion of the target port address in the course of the conversion of the ROUT TAG into a VLAN TAG is not required. The value of the TAG protocol identification of the second data field 595 is changed from the value for the ROUT TAG to the value of the VLAN TAG with 0x8100 (in hexadecimal system). The sender port address is furthermore sent as VLAN ID and the priority with which the EtherCAT telegram may be sent may be adopted as described above in connection with the VLAN TAG. The previous descriptions of the conversion of the ROUT TAG into a VLAN TAG referred to the forward path of a telegram.

On the return path of the telegram from the corresponding segment to the master subscriber 105, the respective network distributor changes the value of the TAG protocol identification of the second data field 595 in the telegram, i.e. the value of the VLAN TAG with 0x8100 (in hexadecimal system) to the value of the ROUT TAG. In addition, the respective network distributor adopts the target port address, which is stored in the routing list of the corresponding network distributor either as a routing decision using operators or as an assigned end port, the sender port address from the VLAN ID, and the priority.

If the fragmenting information of the fifth data field 610 of the ROUT TAG indicates a fragmentation of the telegram on the forward path in the automation network 100 with two master subscribers, for example via a truth value 1, or an alternative indication, the network subscribers of the corresponding segment cannot process a fragmented telegram. The fragmenting field 590 at the end of the telegram is only present if the fragmenting information of the fifth data field 610 takes the truth value 1. Consequently, the first to third network distributors 120, 130, 140 would have to transmit such a telegram by store-and-forward, i.e. store the telegram fragments in the network distributor and only transmit the complete telegram to the respective network subscribers in the segments.

In an automation network with only one master subscriber, however, no telegram collision may occur on the forward path of a telegram from the individual master subscriber to the corresponding segment with network subscribers, since only the individual master subscriber sends a telegram. Consequently, such a telegram with the truth value 0, e.g. cannot indicate any fragmentation of the telegram and may be sent with this information by the master subscriber. On the return path of the telegrams, however, telegram collisions may occur even in an automation network with only one master subscriber if telegrams are received from different segments from the network distributors via the input/output ports of the network distributors, which are designated as end ports. For these end ports, it may then be set in case of a telegram from a network distributor being fragmented that the fragmentation is indicated in the telegram with the truth value 1 for the corresponding end port from the network distributor. For example, in the first network distributor 120, the fourth input/output port P3 would be set, and in the third network distributor 140, the fourth input/output port P3 would be set according to the above description.

If a segment or part of a segment with network subscribers is connected to an input/output port of a network distributor in FIG. 1, which is designated as an end port, the network subscribers being embodied for transmitting data at the second data transmission rate, the network subscribers in such a segment may interpret the ROUT TAG, as well as the fragmenting information. If the fragmenting information of the fifth data field 610 has a truth value of 1, the telegram, i.e. the first telegram fragment, comprises the fragmenting field 590 at the end of the telegram. However, the network subscribers of such a segment for a telegram on the return path would not swap the target port address and the sender port address from the telegram on the forward path. Therefore, an input/output port of a network distributor that is designated as an end port must be set so that the network distributor swaps the target port address and the sender port address for a telegram with the second value of the EtherCAT protocol type, which indicates that processing is enabled, before sending the telegram. A network distributor uses the target port address for outputting or routing a telegram via the correct input/output port of the network distributor, which may be designated as an end port or a forwarding port, while a simple branch routes a telegram via the MAC address, wherein a simple branch may set the sender port address and the target port address correctly for a telegram on its way back to the master subscriber 105.

A telegram that indicates a fragmentation of the telegram via the fragmenting information and comprises the fragmentation field 590 may be processed by a network subscriber that is embodied as a simple branch, but not by a network subscriber that is embodied as a slave subscriber and does not have an additional routing function. Via the corresponding input/output port of a network distributor, which is designated as an end port, fragmented telegrams are thus first buffered by the network distributor until the telegram fragments of a fragmented telegram have been completely received. Only after complete receipt will the network distributor send such a telegram which indicates an enabling of the processing by the second value of the EtherCAT protocol type. A telegram that is embodied as an Ethernet telegram may also be forwarded fragmented by the respective network distributor. Furthermore, it may be set for the respective end port of a network distributor whether fragmentation is possible for a telegram on the return path that has the second value of the EtherCAT protocol type and whether this is to be displayed with the fragmenting information.

In the described example, the second input/output port P1 of the first network distributor 120, which is designated as the end port for the first segment 300, and the fifth input/output port P4 of the first network distributor 120, which is designated as the end port for the third segment 310, may be set in the same manner as the second input/output port P1 of the second network distributor 120, which is part of the first segment 300.

If a network subscriber is connected to an input/output port of a network distributor designated as an end port, which is embodied as a standard switch or as an Ethernet subscriber, these network subscribers would not understand the ROUT TAG. In analogy to a segment with network subscribers, which is embodied as an EtherCAT segment in FIG. 1, no target port address is required for a telegram to an Ethernet switch or an Ethernet subscriber. Therefore, the corresponding network switch converts a ROUT TAG into a VLAN TAG, in analogy to the above description, which is herein not repeated for the individual conversion steps. Also in connection with the possibility of fragmentation, its indication in the telegram, as well as the transmission of the telegram, reference is made to the above description with regard to the network subscribers of a segment embodied for the first data transmission rate. In the automation network 100 shown in FIG. 1, the master subscriber 105 would according configure e.g. the seventh input/output port P6 and the eighth input/output port P7 for the first network distributor 120 and the third input/output port P3 for the third network distributor 140 would be configured accordingly by the master subscriber 105.

If a master subscriber is connected to an input/output port of a network distributor in FIG. 1, which is designated as an end port, the master subscriber may interpret both the ROUT TAG of a telegram and a fragmented telegram as described above. Consequently, the respective network distributor does not need to perform a conversion of the ROUT TAG of a telegram for any telegram on its way back to the master subscriber 105 or to the further master subscriber 110. In the described example, this refers to the first input/output port P0 as well as to the third input/output port P2 of the first network distributor 120. These may be set accordingly by the master subscriber 105.

The network distributors themselves are also capable of interpreting a ROUT TAG. Alternatively, it is contemplated to perform routing in the automation network 100 shown in FIG. 1 using MAC addresses. In this case, the MAC addresses are to be interpreted as target MAC addresses during routing. Furthermore, it is contemplated to combine the variants mentioned for routing by VLAN IDs, by MAC addresses and by port addresses IDY in the automation network 100. In this context, it is contemplated that a network distributor routes telegrams with an existing ROUT TAG via the port addresses IDY, telegrams with an existing VLAN TAG via the VLAN ID or telegrams that have neither ROUT TAG nor VLAN TAG, or telegrams that comprise specific target MAC addresses via the target MAC addresses.

For example, a telegram from the master subscriber 105 may have the third telegram structure TEL3 shown in FIG. 2, in which case the TAG field 565 is embodied as a VLAN TAG. The VLAN TAG may advantageously be used to indicate fragmentation of the telegram by a network distributor on the return path of the telegram from the network subscribers to the master subscriber 105. In this case, the fragmenting information may be entered in a so-called "dropable frame bit". Alternatively, a bit of the VLAN ID may also be used to identify the fragmenting information. However, this has the consequence that the size of the VLAN ID is reduced by 1 bit and the number of possible VLAN IDs available for routing is halved as a result. If a dropable frame bit is set in a frame, a prior art network distributor may discard such a frame if the frame traffic in the automation network 100, also referred to as "traffic", is too high. In the case of the present proposed automation network 100, however, the dropable frame bit is not intended to be used for an indication of a possible discarding of a telegram by a network distributor, but may, due to the free allocation, e.g. be used to indicate fragmenting information, provided that a telegram may be fragmented or has been fragmented. The fragmenting field 590 at the end of the telegram is only present if the fragmenting information indicates a fragmentation of the telegram, for example with a truth value in the form of 1.

When routing by MAC addresses, the master subscriber 105, the further master subscriber 110, the twelfth network subscriber 400, the thirteenth network subscriber 405, the fourteenth network subscriber 410, which are each embodied as an Ethernet subscriber or as an Ethernet switch, as well as the third network subscriber 135, the fourth network subscriber 145, the sixth network subscriber 160 and the tenth network subscriber 180, which are each embodied as a simple branch, have their own MAC address. In addition, during the configuration phase of the automation network 100, the master subscriber 105 may assign a MAC address to each of the individual input/output ports PX of the network distributors to which the segments with network subscribers shown in FIG. 1 are connected via the data line network 200, as a so-called "proxy" MAC address. In particular, these may be the second input/output port P1, the fourth input/output port P3 and the fifth input/output port P4 of the first network distributor 120 as well as the third input/output port P2 of the second network distributor 130 and the fourth input/output port P3 of the third network distributor 140.

If one or a plurality of network subscribers 800 are connected to an input/output port PX of a network distributor, which are embodied for the first data transmission rate, e.g. the fourth segment 315 with the first network subscriber 115 via the fourth input/output port P3 of the first network distributor 120 as well as the fifth segment 320 with the eleventh network subscriber 185 via the fourth input/output port P3 of the third network distributor 140, the network subscribers understand the TAG protocol identification of the second data field 595 in addition to the value for the EtherCAT data transmission protocol in the protocol field 570, provided that the TAG field 565 is embodied as VLAN TAG. Then the TAG protocol identification is embodied as VLAN TAG TAG protocol identification and comprises the value 0x8100 (in hexadecimal system). Accordingly, the corresponding network distributor of the automation network 100 may send a telegram with a VLAN TAG to the above-mentioned segments with network subscribers. For fragmenting, its display in the telegram, as well as for setting the corresponding input/output ports, the above explanation applies in connection with the routing by ROUT TAG and port addresses to the same network subscribers with input/output ports and segments with network subscribers connected to them, so that a repetition of the features is dispensed with at this point.

Provided that one or more network subscribers 800 are connected to an input/output port PX of a network distributor which are configured to transmit data at the second data transmission rate, e.g. the first segment 300 connected via the second input/output port P1 of the first network distributor 120 and the third segment 310 connected via the fifth input/output port P4 of the first network distributor 120, as well as as the second segment 305 connected via the third input/output port P2 of the second network distributor 130. A telegram indicating fragmentation of the telegram via the fragmenting information and comprising the fragmentation field 590 may be processed by a network subscriber configured as a simple branch, but not by a network subscriber configured as a slave subscriber that does not have an additional routing function. For the input/output port of a network distributor via which the corresponding segment is connected, it must therefore be possible to configure for each MAC address that is to be routed via this port whether fragmentable telegrams are possible or must be transmitted via store-and-forward, i.e. only after the telegram fragments have been completely received. For indicating of the fragmentation and for setting the input/output ports, reference is made to the above description of the same input/output ports and segments with network subscribers, as described in connection with the routing by ROUT TAG and port addresses.

If network subscribers 800 are connected to an input/output port PX of a network distributor in FIG. 1, which are embodied as Ethernet subscribers or as Ethernet switches, such as the twelfth network subscriber 400 via the eighth input/output port P7 of the first network distributor 120 and the thirteenth network subscriber 405 via the seventh input/output port P6 of the first network distributor 120 as well as the fourteenth network subscriber 410 via the third input/output port P2 of the third network distributor 140, then said subscribers cannot process a fragmented telegram. For indicating the fragmentation and corresponding setting and of the respective input/output port, reference is made to the description of the network subscribers embodied as Ethernet subscribers in connection with the ROUT TAG and the routing by port addresses.

If a master subscriber is connected to an input/output port PX of a network distributor, e.g. the master subscriber 105 via the first input/output port P0 and the further master subscriber 110 via the third input/output port P2 of the first network distributor 120, the master subscriber may interpret a VLAN TAG in the telegram. Consequently, no conversion of the VLAN TAG has to be performed by the respective network distributor before the telegram is output. Fragmentation of a telegram may also be supported by a master subscriber. For the setting of the mentioned input/output ports, reference is made to the above description of the ROUT TAG with regard to the master subscriber.

Furthermore, as a further alternative to routing by MAC addresses, routing by VLAN IDs is also contemplated in the automation network 100 shown in FIG. 1, provided that the automation network 100 is divided up into logical subnetworks, i.e. VLANs. When routing by VLAN IDs, a VLAN ID is assigned to each possible communication relationship of the automation network 100 by the master subscriber 105 in the configuration phase of the automation network 100. The individual communication relationships are listed in table TAB:

TABLE 1

VLAN ID

| VLAN ID | Communication relationship |
|---|---|
| 1 | master subscriber 105 ↔ first segment 300 |
| 2 | master subscriber 105 ↔ second segment 305 |
| 3 | master subscriber 105 ↔ fifth segment 320 |
| 4 | master subscriber 105 ↔ fourth segment 315 |
| 5 | master subscriber 105 ↔ third segment 310 |
| 6 | master subscriber 105 ↔ twelfth network subscriber 400 |
| 7 | master subscriber 105 ↔ thirteenth network subscriber 405 |
| 8 | master subscriber 105 ↔ fourteenth network subscriber 410 |
| 9 | master subscriber 105 ↔ fourteenth network subscriber 410 |
| 10 | master subscriber 105 ↔ further master subscriber 110 |
| 11 | further master subscriber 110 ↔ first segment 300 |
| 12 | further master subscriber 110 ↔ second segment 305 |
| 13 | further master subscriber 110 ↔ fifth segment 320 |
| 14 | further master subscriber 110 ↔ fourth segment 315 |
| 15 | further master subscriber 110 ↔ third segment 310 |
| 16 | further master subscriber 110 ↔ twelfth network subscriber 400 |
| 17 | further master subscriber 110 ↔ thirteenth network subscriber 405 |
| 18 | further master subscriber 110 ↔ fourteenth network subscriber 410 |
| 19 | further master subscriber 110 ↔ fourteenth network subscriber 410 |
| 21 | master subscriber 105 ↔ sixth network subscriber 160 |
| 22 | master subscriber 105 ↔ tenth network subscriber 180 |
| 23 | master subscriber 105 ↔ third network subscriber 135 |
| 24 | master subscriber 105 ↔ fourth network subscriber 145 |
| 31 | further master subscriber 110 ↔ sixth network subscriber 160 |
| 32 | further master subscriber 110 ↔ tenth network subscriber 180 |
| 33 | further master subscriber 110 ↔ third network subscriber 135 |
| 34 | further master subscriber 110 ↔ fourth network subscriber 145 |
| 41 | fourteenth network subscriber 410 ↔ sixth network subscriber 160 |
| 42 | fourteenth network subscriber 410 ↔ tenth network subscriber 180 |
| 43 | fourteenth network subscriber 410 ↔ third network subscriber 135 |
| 44 | fourteenth network subscriber 410 ↔ fourth network subscriber 145 |
| 50 | fourteenth network subscriber 410 ↔ thirteenth network subscriber 405 |

The VLAN IDs were exemplarily assigned and may also be implemented differently. The ↔ symbol in the table indicates that the communication relationship may originate both from the first subscriber to the second subscriber as well as from the second subscriber to the first subscriber of the respective communication relationship.

In the configuration phase, each input/output port of a network distributor is assigned a list of the VLAN IDs that may be received on the individual input/output port and the input/output port via which a telegram is to be routed. The VLAN ID is transmitted in the VLAN TAG in the telegram according to the above description of the individual telegram structures. For the entry of the fragmenting information, reference is made to the above description for the "dropable frame bit" with regard to routing via MAC addresses. Also in the context of routing via MAC addresses, the input/output ports of the network distributors in the automation network may be divided up into designated end ports to which segments with network subscribers are connected and designated forwarding ports via which further network distributors and network subscribers may be connected. For example, the second input/output port P1 of the first network distributor 120, the first input/output port P0 of the second network distributor 130, and the third input/output port P2 of the second network distributor 130, as well as the first input/output port P0 of the third network distributor 140, may be designated as forwarding ports.

If one or a plurality of network subscribers 800, which are embodied to implement the first data transmission rate, are connected to an input/output port PX of a network distributor designated as an end port, e.g. the fourth segment 315 with the first network subscriber 115 via the fourth input/output port P3 of the first network distributor 120 as well as the fifth segment 320 with the eleventh network subscriber 185 via the fourth input/output port P3 of the third network distributor 140, then these subscribers may interpret the VLAN TAG in such a way that the VLAN TAG may be transmitted by the corresponding network distributor without conversion. For the possibility of fragmenting as well as indicating and setting the input/output ports of the network distributors, reference is made to the above description on routing via port addresses and MAC addresses for the associated network subscribers.

If one or more network subscribers 800 are connected to an input/output port PX of a network distributor in FIG. 1, which are embodied to implement the second data transmission rate, these subscribers may also interpret the VLAN TAG and the corresponding network distributor may transmit the VLAN TAG in the telegram without conversion. Here, the first segment 300 connected via the second input/output port P1 of the first network distributor 120 and the third segment 310 connected via the fifth input/output port P4 of the first network distributor 120 may serve as an example, as well as the second segment 305 connected via the third input/output port P2 of the second network distributor 130. For the remaining features, the above embodiment applies to the same subscribers for routing via MAC addresses. The setting here must be made for each VLAN ID to be routed via the individual input/output ports PX of the network distributors.

If a network subscriber 800 formed as an Ethernet subscriber or as an Ethernet switch, such as the twelfth to fourteenth network subscriber 400, 405, 410, is connected to an input/output port PX of a network distributor designated as an end port, these do not support the fragmentation of a telegram, so that the telegram fragments must be received by the respective network distributor in full before the network distributor outputs them to the subscribers. For indicating the fragmentation and setting the input/output ports, reference is also made to the above description of the same network subscribers in the context of routing via MAC addresses.

If, finally, a master subscriber is connected to an input/output port PX of a network distributor that is designated as an end port, for example the master subscriber 105 via the first input/output port P0 as well as the further master subscriber 110 via the third input/output port P2 of the first network distributor 120, these support both the described fragmentation procedure and the embodying of a telegram with a VLAN TAG. In this respect, no conversion of the VLAN TAG has to be performed. The setting of the input/output ports of the network distributors refers to the mentioned input/output ports of the first network distributor 120.

The present invention has been described in detail by preferred embodiment examples. Instead of the described embodiment examples, further embodiment examples are contemplated which may comprise further variations or combinations of described features. For this reason, the present invention is not limited by the disclosed examples, since other variations may be devised therefrom by those skilled in the art without exceeding the scope of protection of the invention.

TABLE 2

List of reference numerals 100 automation network
105 master subscriber
110 further master subscriber
115 first network subscriber
120 first network distributor
125 second network subscriber
130 second network distributor
135 third network subscriber
140 third network distributor
145 fourth network subscriber
155 fifth network subscriber
160 sixth network subscriber
165 seventh network subscriber
170 eighth network subscriber
175 ninth network member
180 tenth network subscriber
185 eleventh network subscriber
200 data line network
205 first data line
210 second data line
215 third data line
220 fourth data line
225 fifth data line
230 sixth data line
235 seventh data line
240 eighth data line
245 ninth data line
250 tenth data line
255 eleventh data line
260 twelfth data line
300 first segment
305 second segment
310 third segment
315 fourth segment
320 fifth segment
400 twelfth network subscriber
405 thirteenth network subscriber
410 fourteenth network subscriber
500 data structure
505 header section
510 data section
515 end section
520 Ethernet header section
525 EtherCAT header section
530 first datagram TABLE 2-continued List of reference numerals 535 second datagram
540 n-th datagram
545 padding field
550 checksum field
555 target address field
560 sender address field
565 TAG field
570 protocol field
575 length field
580 reserve field
585 first data field
590 fragmenting field
595 second data field
600 third data field
605 fourth data field
610 fifth data field
615 fragment target address field
620 sixth data field
625 seventh data field
630 eighth data field
800 network subscribers

TABLE 3

List of reference symbols

PX input/output ports
P0 first input/output port
P1 second input/output port
P2 third input/output port
P3 fourth input/output port
P4 fifth input/output port
P5 sixth input/output port
P6 seventh input/output port
P7 eighth input/output port
TEL1 first telegram structure
TEL2 second telegram structure
TEL3 third telegram structure
TEL4 fourth telegram structure
TEL5 fifth telegram structure
TEL6 sixth telegram structure
IDY port address
ID1 first port address
ID2 second port address
ID3 third port address
ID4 fourth port address
ID5 fifth port address
ID6 sixth port address
ID7 seventh port address
ID8 eighth port address
ID9 ninth port address
ID10 tenth port address
TAB table

The invention claimed is:

1. A method for routing telegrams in an automation network,
wherein the automation network comprises network subscribers interconnected by a data line network,
wherein at least one network subscriber is configured as a master subscriber and sends telegrams to the network subscribers via the data line network,
wherein at least one network subscriber is formed as a network distributor having a plurality of input/output ports, wherein the input/output ports to which segments with further network subscribers are respectively connected are designated as end ports,
wherein the master subscriber assigns a port address to each of the end ports,
wherein the master subscriber assigns, as an identifier, the port address of the end port to which the segment with further network subscribers is connected to a telegram intended for processing for a segment with further network subscribers, and
wherein, when the network distributor receives a telegram having a port address of an end port of the network distributor as an identifier, the network distributor outputs the telegram directly through the input/output port of the network distributor corresponding to the end port of the port address; and
wherein the port addresses of the end ports of the network distributor are formed as a continuous series,
wherein the network distributor is configured to select, based on operators, from a set of the continuous series, a subset of the continuous series for routing the telegrams with port addresses as identifiers, and
wherein the operators are configured as comparison operators and/or as logical operators.

2. The method according to claim 1,
wherein the network distributor comprises input/output ports designated as forwarding ports, and
wherein, when the network distributor receives a telegram with an identifier that does not correspond to a port address of an end port of the network distributor, the network distributor routes the telegram via a forwarding port of the network distributor stored in a routing table.

3. The method according to claim 2,
wherein the forwarding port is simultaneously designated as the end port,
wherein the master subscriber is configured to send telegrams disabled for processing by the network subscribers over the data line network, and
wherein, when the network distributor receives a telegram with a port address as an identifier from the master subscriber, the telegram is intended for an end port of the network distributor and is disabled for processing by the network subscribers, the network distributor unlocks the telegram with the port address as identifier and outputs it via the corresponding input/output port assigned to the end port of the port address to the segment with further network subscribers for processing.

4. The method according to claim 1,
wherein the master subscriber sends query telegrams over the data line network to detect the input/output ports of the network distributor, and
wherein the master subscriber assigns the port address after receiving a query telegram from the network distributor with port information about the input/output ports of the network distributor to which segments with further network subscribers are respectively connected and are configured as end ports.

5. An automation network comprising network subscribers interconnected by a data line network, comprising:
a computer processor and memory connected to at least one network subscriber that is configured as a master subscriber and that is configured to send telegrams to the network subscribers via the data line network;
wherein at least one network subscriber is configured as a network distributor having a plurality of input/output ports, wherein the input/output ports to which segments with further network subscribers are respectively connected are designated as end ports,
wherein the master subscriber is configured to assign a port address to each of the end ports,
wherein the master subscriber is configured to assign, as an identifier, to a telegram intended for a segment with further network subscribers the port address of the end port to which the segment with further network subscribers is connected, and wherein the network distributor is adapted, when the network distributor receives a telegram with a port address of an end port of the network distributor as an identifier, to output the telegram directly via the input/output port of the network distributor corresponding to the end port of the port address;

wherein the port addresses of the end ports of the network distributor are formed as a continuous series, wherein the network distributor is configured to select, based on operators, from a set of the continuous series, a subset of the continuous series for routing the telegrams having port addresses as identifiers, and wherein the operators are configured as comparison operators and/or as logical operators.

6. The automation network according to claim 5, wherein the network distributor is configured to comprise input/output ports designated as forwarding ports, and wherein the network distributor is configured, when the network distributor receives a telegram with an identifier that does not correspond to a port address of an end port of the network distributor, to route the telegram via a forwarding port of the network distributor stored in a routing table.

7. The automation network according to claim 6, wherein the forwarding port is simultaneously configured as an end port, wherein the master subscriber is configured to send telegrams disabled for processing by the network subscribers over the data line network, and wherein the network distributor is configured, when the network distributor receives a telegram with a port address as an identifier from the master subscriber, which telegram is intended for an end port of the network distributor and is disabled for processing by the network subscribers, to unlock the telegram with the port address as identifier and to output it to the segment with further network subscribers for processing via the corresponding input/output port assigned to the end port of the port address.

8. The automation network according to claim 5, wherein the master subscriber is configured to send query telegrams over the data line network for detecting the input/output ports of the network distributor, and wherein the master subscriber is configured to assign the port address after receiving a query telegram from the network distributor with port information about the input/output ports of the network distributor to which segments with further network subscribers are respectively connected and are configured as end ports.

9. The automation network according to claim 5, wherein the automation network is configured as an EtherCAT network and the telegrams are configured as EtherCAT telegrams.

10. A network distributor, wherein the network distributor comprises:

a computer processor and memory connected to a plurality of input/output ports, wherein the input/output ports to which segments with further network subscribers are respectively connected are designated as end ports, wherein each of the end ports is assigned a port address, wherein as an identifier to a telegram intended for a segment with further network subscribers the port address of the end port, to which the segment with further network subscribers is connected, is assigned, wherein the network distributor is adapted, when the network distributor receives a telegram with a port address of an end port of the network distributor as an identifier, to output the telegram directly via the input/output port of the network distributor corresponding to the end port of the port address;

wherein the port addresses of the end ports of the network distributor are formed as a continuous series, wherein the network distributor is configured to select, based on operators, from a set of the continuous series, a subset of the continuous series for routing the telegrams having port addresses as identifiers, and wherein the operators are configured as comparison operators and/or as logical operators.

11. The network distributor according to claim 10, wherein the network distributor is configured to comprise input/output ports designated as forwarding ports, and wherein the network distributor is configured, when the network distributor receives a telegram with an identifier that does not correspond to a port address of an end port of the network distributor, to route the telegram via a forwarding port of the network distributor stored in a routing table.

12. The network distributor according to claim 11, wherein the forwarding port is simultaneously configured as an end port, wherein a master subscriber is configured to send telegrams disabled for processing by the network subscribers over the data line network, and wherein the network distributor is configured, when the network distributor receives a telegram with a port address as an identifier from the master subscriber, which telegram is intended for an end port of the network distributor and is disabled for processing by the network subscribers, to unlock the telegram with the port address as identifier and to output it to the segment with further network subscribers for processing via the corresponding input/output port assigned to the end port of the port address.

13. The network distributor according to claim 10, wherein the network distributor is configured as EtherCAT network distributor and the telegrams are configured as EtherCAT telegrams.

14. The method according to claim 1, wherein the telegrams are configured as EtherCAT telegrams.

* * * * *